United States Patent
Muto

(10) Patent No.: US 6,807,194 B1
(45) Date of Patent: Oct. 19, 2004

(54) RADIO TERMINAL STATION APPARATUS FOR SDH NETWORK AND METHOD OF SELECTING OPERATION CLOCK THEREOF

(75) Inventor: Hideyuki Muto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/248,096

(22) Filed: Feb. 11, 1999

(30) Foreign Application Priority Data

Feb. 18, 1998 (JP) .......................................... 10-035299

(51) Int. Cl.[7] .............................................. H04J 3/06
(52) U.S. Cl. .................................................... 370/503
(58) Field of Search ................................ 370/338, 498, 370/503, 507, 509, 516, 315

(56) References Cited

U.S. PATENT DOCUMENTS

| | | | | |
|---|---|---|---|---|
| 5,687,015 A | * | 11/1997 | Abe | ............................ 327/292 |
| 5,955,959 A | * | 9/1999 | Taki et al. | .................... 340/3.2 |
| 6,014,414 A | * | 1/2000 | Yamamoto et al. | .......... 375/356 |
| 6,169,753 B1 | * | 1/2001 | Yoshida | ....................... 370/507 |
| 6,173,023 B1 | * | 1/2001 | Tanonaka et al. | ............ 375/354 |
| 6,262,973 B1 | * | 7/2001 | Shiraishi et al. | ............. 370/228 |

* cited by examiner

*Primary Examiner*—Seema S. Rao
*Assistant Examiner*—Kevin C. Harper
(74) *Attorney, Agent, or Firm*—Young & Thompson

(57) ABSTRACT

A radio terminal station apparatus for an SDH network wherein the synchronous network construction never breaks, even when a wired transmission line is branched. In a multiplexing quality generation circuit for multiplexing and sending out quality information of a clock, the insertion direction and insertion system to multiplex the quality information are compared with the input direction and system providing the clock in the apparatus, and, in the case of the insertion system not being the system providing the clock in the apparatus and the insertion direction being opposite to the input direction of the clock in the apparatus and when the priority degree information of the system having an input direction opposite to the insertion direction is a special value defined in advance, the same quality information as the clock in the apparatus are multiplexed and sent out.

7 Claims, 15 Drawing Sheets

| S1(b5-b8) | QUALITY | EXAMPLE OF QUALITY ESTABLISHMENT |
|---|---|---|
| 0000 | QUALITY UNKNOWN | |
| 0001 | RESERVE | |
| 0010 | G.811 | Q=2 |
| 0011 | RESERVE | |
| 0100 | G.812 transit | Q=3 |
| 0101 | RESERVE | |
| 0110 | RESERVE | |
| 0111 | RESERVE | |
| 1000 | G.812 local | Q=4 |
| 1001 | RESERVE | |
| 1010 | RESERVE | |
| 1011 | SETS | Q=5 |
| 1100 | RESERVE | |
| 1101 | RESERVE | |
| 1110 | RESERVE | |
| 1111 | Don't use for sync | Q=F |

Fig. 7

RADIO TERMINAL STATION APPARATUS FOR SDH NETWORK AND METHOD OF SELECTING OPERATION CLOCK THEREOF

BACKGROUND OF THE INVENTION (i) Field of the Invention

The present invention relates to a radio terminal station apparatus for an SDH network, particularly to a method of selecting an operation clock in a radio terminal station apparatus for an SDH communication connected to a wired transmission line or a wireless transmission line.

(ii) Description of the Related Art

SDH (Synchronous Digital Hierarchy) is a standard established for standardizing synchronous networks, and its details are regulated by ITU-T or the like. FIG. 6 is a view showing the structure of an STM-1 frame in an SDH frame structure. The STM-1 frame consists of an SOH (Section Over Head) consisting of a frame synchronization, a parity of a transmission line, a transmission line for maintenance data and so on, an AU pointer for indicating the head of a data signal sequence when changing clocks, a payload that is a data signal sequence, and so on.

Besides, an S1 byte in the SOH is defined for transmitting a quality that is the quality of a clock in a synchronous network. The quality indicated by the S1 byte is defined by ITU-TG.707 or the like. By extracting the quality Q from the S1 byte in the SOH, the quality of the clock of a transmission line can be known. FIG. 7 shows an example of the contents of this quality Q.

Besides, in the SDH network, synchronization of the whole of the network is necessary for keeping the quality of the network high, and the clock source that is the origin of the synchronous network becomes important. For this reason, there is a case that, in addition to a primary clock supply source of the highest quality, a secondary clock source is provided for use when a trouble arises on this primary clock source and it can not be used, and the primary and secondary clock sources are switched over with the quality in the S1 byte. At this time, for the secondary clock, a clock source of a lower quality than the primary clock is mostly employed for an economical reason or the like.

Further, each NE (Network Element: synchronous terminal station apparatus) mostly has an internal clock source that is used when either of the primary and secondary clock sources can not be used. Besides, in apparatus for transmitting data signal sequences including SDH frames, there are transmission terminal station apparatus that make communications through wired transmission lines such as optical cables and radio terminal station apparatus that are connected to such transmission terminal station apparatus and make communications through wireless transmission lines.

FIG. 8 shows an example in which an SDH network is built with such transmission and radio terminal station apparatus. In FIG. 8, NE1, NE2, NE7 and NE10 denote transmission terminal station apparatus, and NE3, NE4, NE5, NE6, NE8 and NE9 do radio terminal station apparatus. U1 denotes a primary clock source that is the origin of an ordinary SDH synchronous network, and U2 does a secondary clock source.

Besides, it is the example in which the network construction branches into two directions at the wired transmission lines from NE4 to NE5 and NE8. Further, each of SYS1 and 2 has a set of up-link or down-link data signal sequences including SDH frames, and MUX denotes a multiplexer, and DMR does a digital microwave radio equipment. As understood from FIG. 8, in a wireless transmission line, data signal sequences of plural system are transmitted and received through a single antenna in general, so the network never branches at the wireless line.

By the way, although it was above described that, when the SDH network is constructed, the whole of the network is synchronized, and a case that a trouble arises on the clock of the origin of synchronization, or the like is dealt with by switching over, at this time, if opposed apparatus are synchronized with line clocks from opposite directions, respectively, a loop is generated in the clock synchronization construction, as a result, the network synchronization construction breaks. This operation is called timing loop. For preventing this operation, in the S1 byte indicating the clock quality, as shown in FIG. 7, "Don't use for sync" of Q=F is defined, and the line clock of the route on which Q=F is detected is not used as the clock in the apparatus.

A conventional radio or transmission terminal station apparatus has clock selection means in which a process of a flowchart shown in FIG. 9A or 9B is carried out as a method of determining a quality to insert. FIG. 9A shows a flowchart used when the transmission directions of the whole system are the same like radio terminal station apparatus. In this flowchart, when the clock in the apparatus is generated from a line clock, Q=F on the qualities to multiplex on all systems in which the direction of multiplexing the qualities is opposite to the line clock that was the origin of the clock in the apparatus.

FIG. 9B shows a flowchart used in a transmission terminal station apparatus or the like, wherein, in case that the clock in the apparatus is generated from a line clock, Q=F is multiplexed only when the direction of multiplexing the qualities is opposite to the line clock that was the origin of the clock in the apparatus and the system is the same route.

Next, operations of the SDH network constructed with conventional radio terminal station apparatus having the process flowchart of FIG. 9A will be described with reference to FIGS. 10A and 10B. In FIGS. 10A and 10B, FIG. 10A shows synchronization of clocks in a stationary state. In this FIG. 10A, line clocks of both routes of (NE1→NE2→NE3→NE4) and (NE1→NE2→NE5→NE6) all are synchronized with the output clock of U1. Here, (NE1→NE2) denotes direction of clock signal transmitted from NE1 to NE2. All of multiplexed qualities of routes of (NE4→NE3→NE2→NE1) and (NE6÷NE5→NE2→NE1), which are in the opposite directions of the above routes, are Q=F. P denotes a priority showing the degree of priority, and shows information on the degree of priority assigned to each clock of the input port part of SYS1 and 2 or the like of each apparatus, respectively.

Here, as shown in FIG. 10B, supposing a case that a trouble or the like arises on the output clock of U1 and it can not be used, all line clocks of route of (NE4→NE3→SYS1 of NE2→NE1) are synchronized with the secondary clock of U2. However, in NE2, because the line clock from NE3 becomes the clock in the apparatus, the quality sent out from SYS2 of NE2 to NE5 becomes the quality of Q=F for inhibiting a timing loop. Thereupon, in NE5, because the quality from the SYS2 of NE2 is Q=F, it can not be used as the clock in the apparatus and it operates with the internal clock of the highest quality in the apparatus. Accordingly, NE6 is also synchronized with the internal clock of NE5, and NE5 and NE6 operate separately from the conventional synchronous network.

Successively, operations of the SDH network constructed with conventional radio terminal station apparatus having the process flowchart of FIG. 9A and conventional transmission terminal station apparatus having the process flowchart of FIG. 9B will be described with reference to FIGS. 11A to 11D. FIG. 11A shows synchronization of clocks in a stationary state. In FIG. 11A, all line clocks of route of (NE1→NE2→NE3) are synchronized with the output clock of U1, and all multiplexed qualities of route of (NE3→NE2→NE1), which are in the opposite direction of the above route, are Q=F.

In this state, like FIG. 11B, supposing a case that a trouble arises on the output of U1, because the clock having the highest quality in NE1 is the internal clock, line clocks of route (NE1→NE2→NE3) are once synchronized with the internal clock of NE1. Thereupon, in NE3, because the clock having the highest quality changes from the line clock from NE2 to the secondary clock of U2, switchover is done in the order of (NE3→NE2→NE1) so as to synchronize with the output clock of U2, as shown in FIG. 11C.

At this time, though multiplexing qualities in the radio terminal station apparatus of NE2 to the direction of NE3 is Q=F at both of SYS1 and SYS2, in the transmission terminal station apparatus of NE1, as shown in the flowchart of FIG. 9B, to other than the system in which the line clock that was the origin of the clock in the apparatus was extracted, because the quality of the clock in the apparatus is multiplexed, as shown in FIG. 11C, Q=3 is sent out from SYS2 of NE1 to NE2.

Thereupon, in NE2, because the quality from NE3 and the quality from NE1 become the same and the clock from NE1 that has a higher priority is selected as the clock in the apparatus, immediately after the selection, as shown in FIG. 11D, the multiplexed quality of route (NE2→NE1) is converted into Q=F. Accordingly, the line clock from NE2 can not be selected in NE1, as a result, because of returning to the state of FIG. 11B, the clock in the apparatus becomes in a timing loop state.

For preventing this, necessary is a change of establishment such as that, as for the line clock of route of (NE1→NE2), in order not to take redundant constructions at SYS1 and SYS2, the quality of SYS2 of NE2 is made to be always Q=F.

In this manner, in conventional radio terminal station apparatus, in relation to processing on the qualities to multiplex, there are a problem that the synchronous network construction breaks in case that a route of the network is branched at wired transmission lines, a problem that a redundant construction for a route having a line clock of a high quality can not be taken, furthermore, a point at issue that there is a possibility to generate a timing loop.

SUMMARY OF THE INVENTION

The present invention has been made in view of the above points at issue and aims to provide a radio terminal station apparatus for an SDH network, wherein, by defining a special priority value in a system beforehand, a redundant construction for a route having a line clock of a high quality is maintained and the synchronous network construction never breaks even in case that a wired transmission line is branched, and a method of selecting an operation clock thereof.

In a radio terminal station apparatus for an SDH network of the present invention, the quality/clock extracted from each system and each direction is input to a clock selection part. In this clock selection part, first, in a quality judgement circuit, the route information and quality value of the clock of the highest quality from among the qualities of an external clock, an internal clock and a line clock from each system are output to a control signal generation circuit. In the control signal generation circuit, in case of a single clock of the highest quality in the input quality information, the clock is selected, and, in case of a plurality of clocks, the route of the highest priority judged by a priority judgement circuit is selected, and a clock selection signal for using it as the clock in the apparatus, and the quality and extraction route information of the clock to be the clock in the apparatus are output.

In a multiplexing quality generation circuit, the direction and system to multiplex the quality are compared with the input direction and system of the clock in the apparatus, and, only in case of not the same system but the opposite direction and when the priority establishment of the input opposite to the insertion direction is a special value defined in advance, the same quality as the clock in the apparatus is multiplexed.

As described above, when determining a quality to multiplex, by using the priority established on the input opposite to the direction to multiplex the quality, a communication terminal station apparatus can be provided wherein, even in case of the transmission route of the data signal sequence branching, the synchronous network of the branched route never breaks, and further, in case that there are a plurality of routes having clocks of high qualities in the same direction, the degree of redundant can be kept and the synchronous network construction never breaks.

BRIEF DESCRIPTION OF THE DRAWINGS

FIG. 7 is a view showing an example of quality information of a clock;

DETAILED DESCRIPTION OF THE PREFERRED EMBODIMENTS

Hereinafter, an embodiment of the present invention will be described with reference to drawings.

Figure 1:
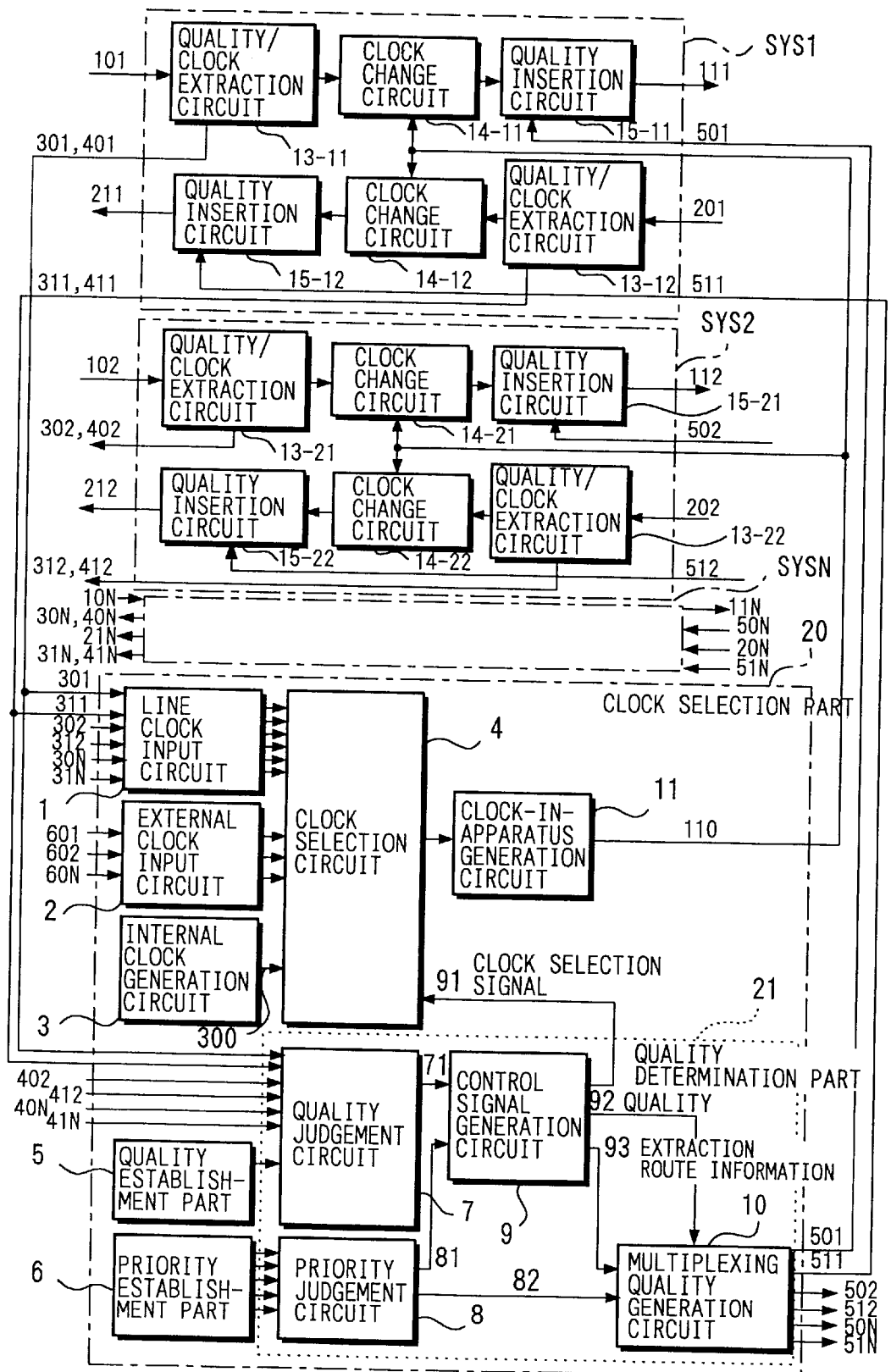
FIG. 1 is a block diagram of an example of a radio terminal station apparatus of the present invention.

FIG. 1 is a block diagram of an embodiment of the present invention. The embodiment shown in FIG. 1 is a radio terminal station apparatus having systems (SYS) each of which has a set of up-link and down-link data signal sequences including SDH frame constructions, for N (N is an integer of two or more) systems (SYS1 to N), wherein 101 to 10N and 211 to 21N denote data signal sequences connected to transmission terminal station apparatus or the like through wired transmission lines, and 111 to 11N and 201 to 20N do data signal sequences to transmit and receive through wireless transmission lines via a modem or the like.

In the system 1 (SYS1) of FIG. 1, the data signal sequence 101 transmitted through the wired transmission line is input to a quality/clock extraction circuit 13-11, and the line clock 301 and quality information (quality) 401 of the line clock contained in SOH (Section Over Head) are extracted to be input to a line clock input circuit 1 of clock selection part 20 and a quality judgement circuit 7 in quality determination part 21.

Similarly, the data signal sequence 201 through the wireless transmission line is input to a quality/clock extraction circuit 13-12, and the line clock 311 and quality 411 are output. Similarly in the other systems, the line clocks 30n and 31n (n is an integer of $1 \leq n \leq N$) synchronized with the wired and wireless transmission lines, respectively, and the respective qualities 40n and 41n are output to the above line clock input circuit 1 and quality judgement circuit 7.

An external clock input circuit 2 is a circuit to which a clock of an external clock source to be a basis of the synchronous network in the SDH network is input, and M (M is a natural number) clocks 601 to 60M can be input. Generally, the apparatus for outputting the clock to be a basis of the synchronous network is mostly set up in the master and slave stations, and, in the other stations, there is no input of clock to the external clock input circuit 2. An internal clock generation circuit 3 is a circuit for generating a clock necessary to transmit a data signal sequence to a low-ranking station when any line clock can not be extracted due to a trouble or the like on a transmission line.

Outputs of the external clock input circuit 2 and internal clock generation circuit 3 are input to a clock selection circuit 4. The clock selection circuit 4 determines a clock used in the apparatus on the basis of control information 91 from a control signal generation circuit 9 described later, and then outputs it to a clock-in-apparatus generation circuit 11. The clock-in-apparatus generation circuit 11 outputs a clock-in-apparatus 110 synchronized with an output clock of the clock selection circuit to a clock change circuit 14 of each system.

In the clock change circuit 14 of each system, by changing data signal sequences on the basis of the clock-in-apparatus 110, data signal sequences synchronized with the SDH network are output. A quality establishment part 5 is a circuit for establishing qualities for an input clock to the external clock input circuit 2 and a clock of the internal clock generation circuit 3, and establishes a quality of a route that no quality can be obtained from SOH and outputs it to a quality judgement circuit 7.

A priority establishment part 6 is a circuit for establishing the degree of priority to the line clocks 301 to 30N, external clocks 601 to 60M and internal clock 300, namely, all clocks input to the clock selection circuit 4, and assigns numerical values in descending order of the degree of priority. Further, a special priority for changing processing methods in quality determination part 21 described later can be established. In the quality determination part 21, in the quality judgement circuit 7, the qualities of input clocks to the clock selection circuit 4 are judged and route information 71 of the clock of the best quality is output.

A priority judgement circuit 8 detects a priority established to the input clock to the clock selection circuit 4 to output route establishment information 81, and, when there is a route that a special priority defined in advance has been established, outputs special priority route information 82. The control signal generation circuit 9 judges the route of the highest priority with the highest quality on the basis of the output route information 71 of the quality judgement circuit 7 and the output establishment route information 81 of the priority judgement circuit 8, and outputs control information 91 for a clock-in-apparatus, quality information 92 of the clock-in-apparatus, and route information 93 of the clock that was the origin of the clock-in-apparatus.

In a multiplexing quality generation circuit 10, priorities to multiplex are determined on the basis of the quality information 92 and route information 93 of the control signal generation circuit 9 and the output special priority 82 of the priority judgement circuit 8 to output.

Figure 2:
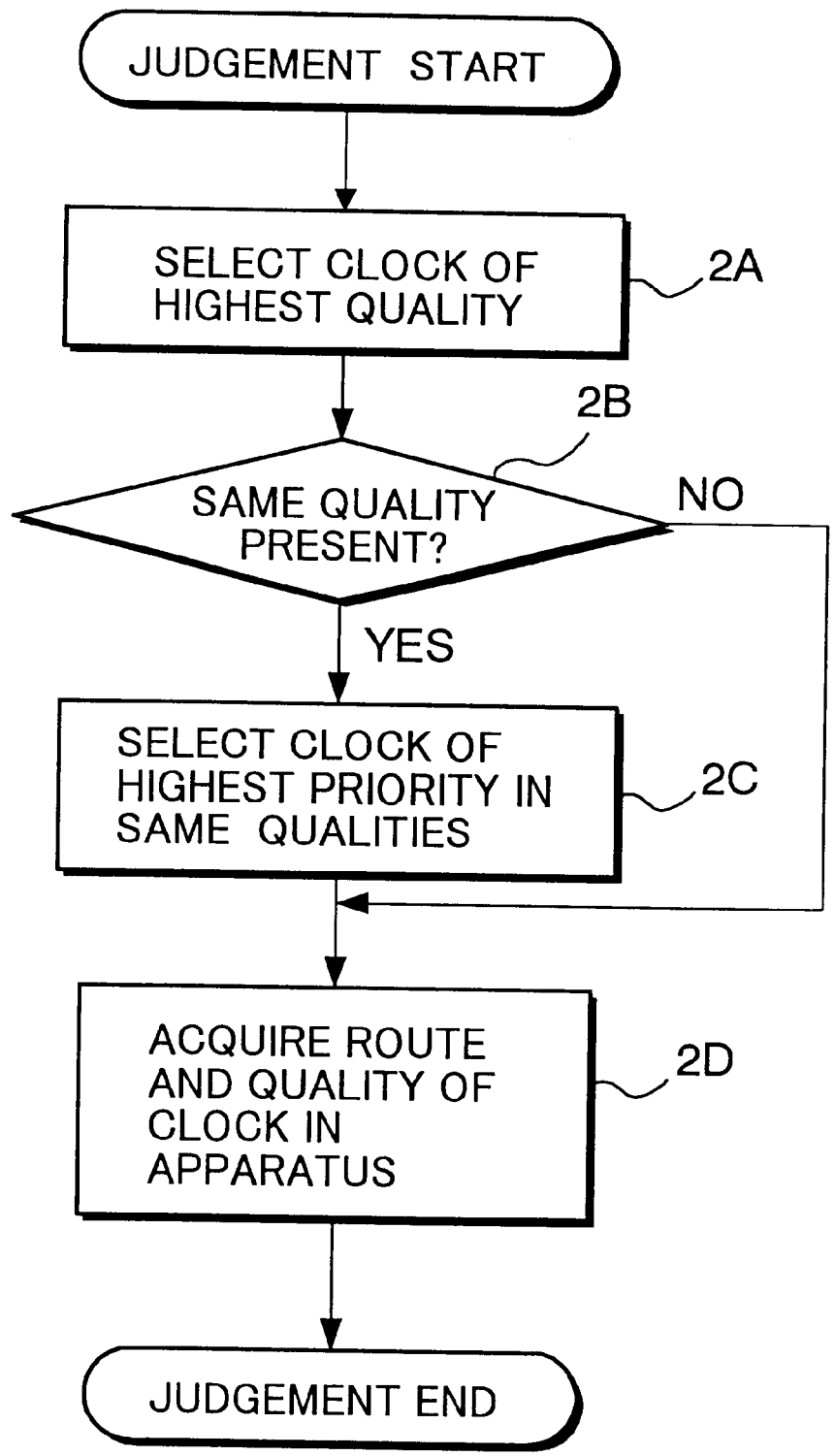
FIG. 2 is a flowchart showing operations of the embodiment of the present invention.

Next, operations of the quality determination part 21 of the embodiment shown in FIG. 1 will be described with reference to FIGS. 2 and 3. FIG. 2 is a view showing a process flowchart in the quality judgement circuit 7, priority judgement circuit 8 and control signal generation circuit 9. First, in the quality judgement circuit 7, by carrying out the process of the part of a step 2A of FIG. 2, the route of the clock having the highest quality is judged. Next, in the priority judgement circuit 8 and control signal generation circuit 9, the processes of steps 2B to 2D are carried out so that, when there are a plurality of clocks of the quality of the highest quality, by selecting one that the established priority is the highest, the route and quality of the clock-in-apparatus are acquired.

By the way, in the synchronous network of the SDH network, the quality of the clock-in-apparatus is multiplexed with S1 byte of SOH as shown in FIG. 7 and an apparatus to connect has notice of it, so that the connected apparatus uses it for determining a clock in the apparatus to use. At this time, it is necessary to make the synchronous network construction of the SDH network not in a loop state to form a timing loop. So, "Don't use for sync ("F")" that is a quality for indicating not to select as a clock of the synchronous network is regulated by ITU-T G.707 or the like.

Figure 3:
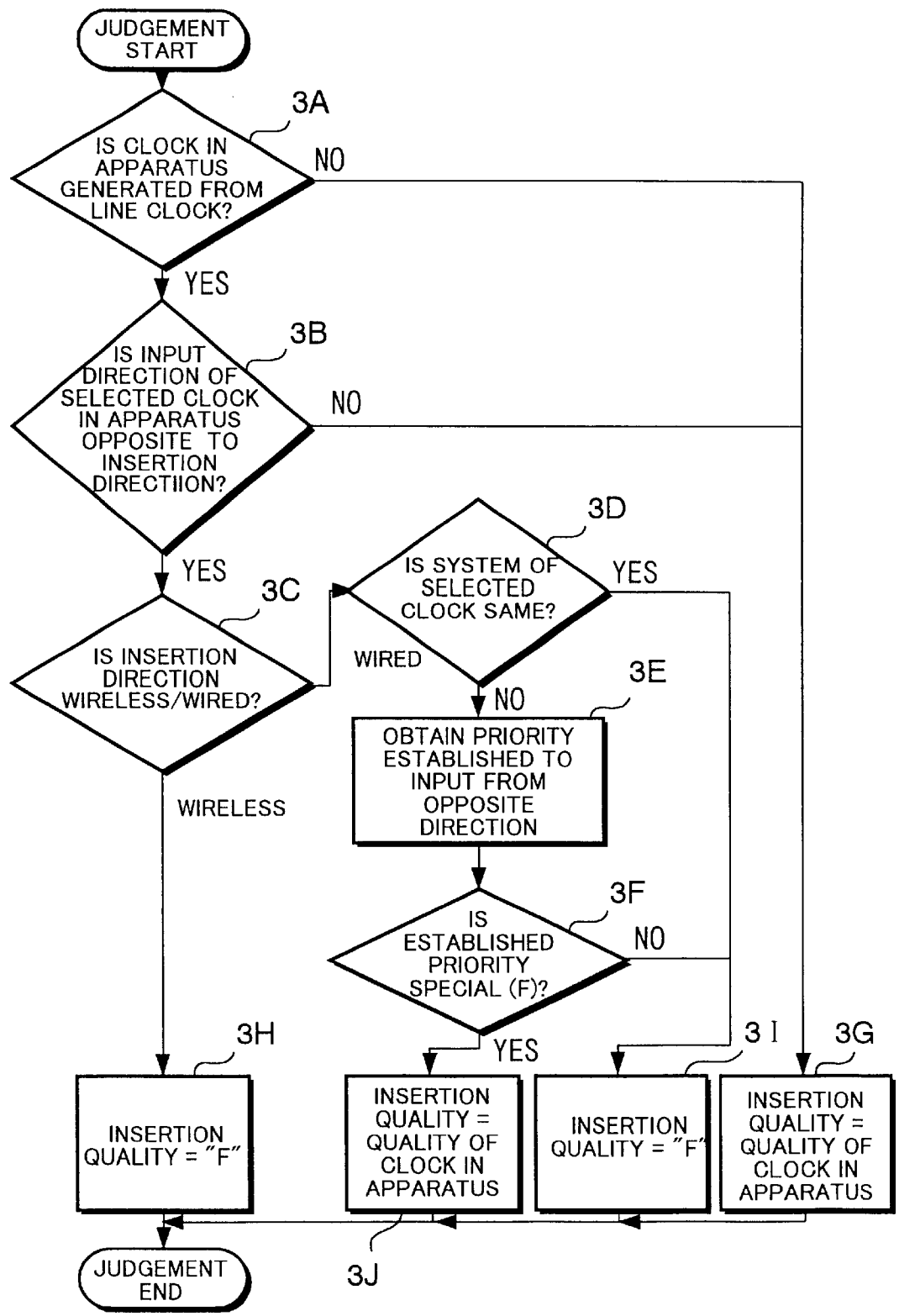
FIG. 3 is a flowchart showing operations of the embodiment of the present invention.

In the priority judgement circuit 8, control signal generation circuit 9 and multiplexing quality generation circuit 10, by carrying out the flowchart shown in FIG. 3, multiplexing qualities in consideration of timing loop is performed. First, when the clock that was the origin of the clock in the apparatus is not a line clock (in case of NO in step 3A), the quality of the clock in the apparatus is multiplexed because there is no possibility to form a timing loop (step 3G).

On the other hand, the following process is carried out when the clock that was the origin of the clock in the apparatus is a line clock (in case of YES in step 3A). First, the system and direction to multiplex the quality is compared with the output route information 93 of the control signal generation circuit 9, and it is judged whether or not the line clock that was the origin of the clock in the apparatus is the opposite direction to the quality multiplexing direction. Unless this judgement result is not the opposite direction (in case of NO in step 3B), because there is no possibility to form a timing loop, the quality of the clock in the apparatus is multiplexed (step 3G), and, in case of the opposite direction, the insertion direction of the quality is judged (step 3C).

Next, in case that the insertion direction is a wireless direction, "F" (Don't use for sync) is multiplexed with the quality (Q) even when the line clock that was the origin of the clock in the apparatus is not the same system (step 3H), in case of a wired direction, the process flow shifts to step 3D. In this step 3D, in case that the line clock that was the origin of the clock in the apparatus and the insertion system of the quality are the same, "F" is multiplexed with the quality (step 3I), in the other cases, a priority established to the input from the opposite direction of the system to multiplex the quality is detected (step 3E).

Only when this detected priority is the special priority (which is supposed to be "F" in this embodiment) defined in the system beforehand, the quality of the clock in the apparatus is used as the quality to insert (step 3J), in the other cases, "F" is multiplexed with the quality (step 3I).

Successively, an example of operations on the SDH network construction using the radio terminal station apparatus shown in the embodiment of FIG. 1 will be described by using an example of construction of FIG. 4. In FIG. 4, NE1 to NE6 denote radio terminal station apparatus, and U1 to U2 do external clock sources, wherein U1 is a primary clock source of the highest quality on the network and U2 is a secondary clock source for spare, in the drawing, Q does a quality, besides, P does an established priority. Besides, as described above, the special priority for judging quality multiplexing conditions is supposed P=F.

Further, a line connected between NEs indicates a synchronous state of clock. Further, for simplifying the description, it is supposed that the number of systems of NE1 to NE2 is two, the number of systems of NE3 to NE6 is one, and this is a network branched into two directions in the wired transmission line direction of NE2.

Figure 4A:
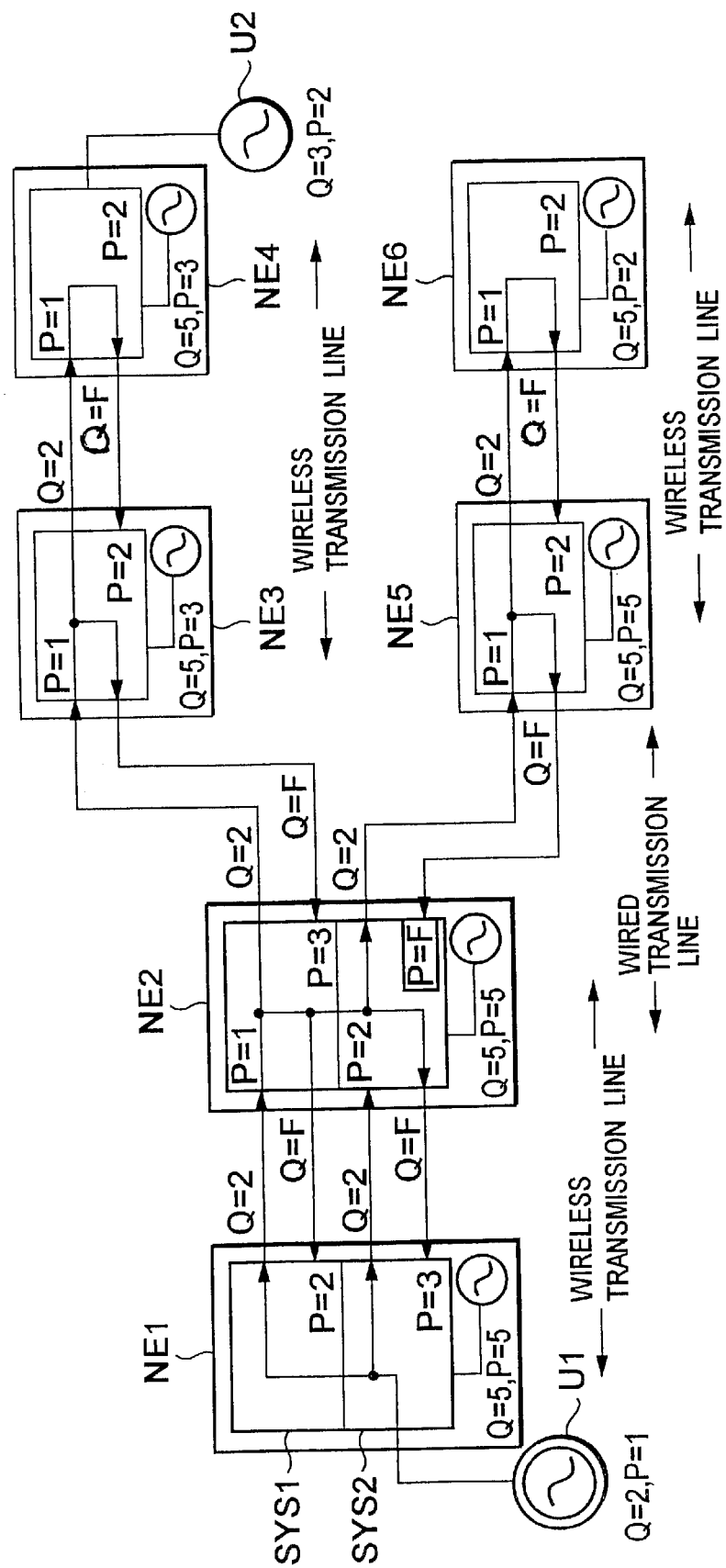
FIGS. 4A and 4B are block diagrams for illustrating operations of the embodiment of the present invention.

FIG. 4A is a view showing a stationary state. In FIG. 4A, in NE1, because the clock of the highest quality among the clock sources to input is the U1 output clock of Q=2, the data signal sequence to input to NE1 is changed in its clock to the clock in the apparatus synchronized with the U1 output, in the clock change circuit. And, in the quality insertion circuit, Q=2 is multiplexed, and the data signal sequence is sent out from SYS1 and SYS 2 to NE2.

Next, considering the quality in NE2, either of the qualities of SYS1 and SYS2 transmitted from NE1 through the wireless transmission line is Q=2 that is the highest. Because the priorities at this time are P=1 for SYS 1 and P=2 for SYS 2, the line clock of SYS1 from NE1 is selected as the clock in the apparatus.

Besides, in the quality insertion circuit, Q=2 that is the quality of the clock in the apparatus is multiplexed for NE3 and NE5 of the same direction as the line clock that was the origin of the clock in the apparatus, Q=F for inhibiting a timing loop is multiplexed in both of SYS 1 and SYS 2 for the NE1 direction that is the opposite direction. Similarly as for NE3 to NE6, the line clocks in the directions of (NE1→NE2→NE3→NE4) and (NE1→NE2→NE5→NE6) become the clocks in the apparatus, and, by multiplexing Q=2 in the same direction and Q=F in the opposite direction, the whole of the network is synchronized with the output clock of U1.

Figure 4B:
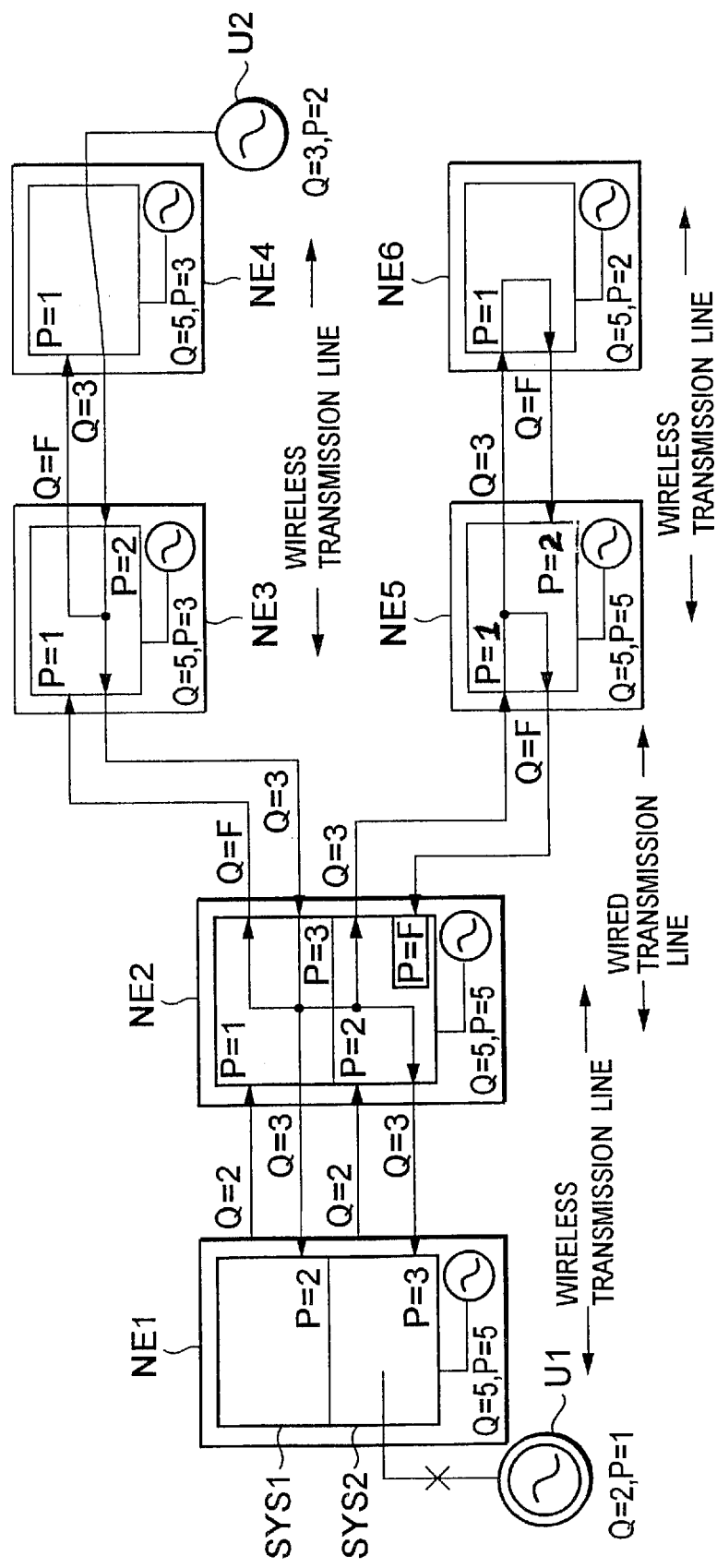

Besides, operations in case that a trouble or the like arises on the output of U1 and it can not be used will be described with reference to FIG. 4B. In FIG. 4B, the clock of the highest quality among usable clocks is the output clock of U2. At this time, NE4 operates with the output clock of U2 as the clock in the apparatus, and outputs Q=3 in the NE3 direction.

In the next NE3, it is synchronized with the line clock in the direction of (NE4→NE3) to operate, and multiplexes Q=3 in the NE2 direction and Q=F for inhibiting a timing loop in the NE4 direction. Successively, operations of NE2 are as follows. The highest quality in NE2 is the input from NE3 of Q=3. Accordingly, because the clock in the apparatus is synchronized with the line clock from NE3, Q=3 is multiplexed and output to NE1. Besides, because the output direction to NE3 is the opposite direction to and the same direction as the line clock that was the origin of the clock in the apparatus, Q=F is multiplexed as the quality in the NE3 direction.

By the way, for SYS2 of NE2, that is, the input from the NE5 direction, the special priority P=F is established. Accordingly, it is judged that the output to NE5 is not in the opposite direction to the line clock from NE3, not Q=F but Q=3 that is the quality of the clock in the apparatus is multiplexed. Next, in NE5, because the quality from SYS2 of NE2 is the highest, it is synchronized with the line clock from SYS2 of NE2, and multiplexes Q=3 to NE6 of the same direction as the line clock for the clock in the apparatus, and Q=F in the direction of NE2 and SYS2 of the opposite direction.

As described above, in case of FIG. 4B, the network is synchronized in the order of (NE4→NE3→NE2→NE1) and (NE4→NE3→NE2→NE5→NE6), and the whole of the network is synchronized with the output clock of U2.

Figure 5A:
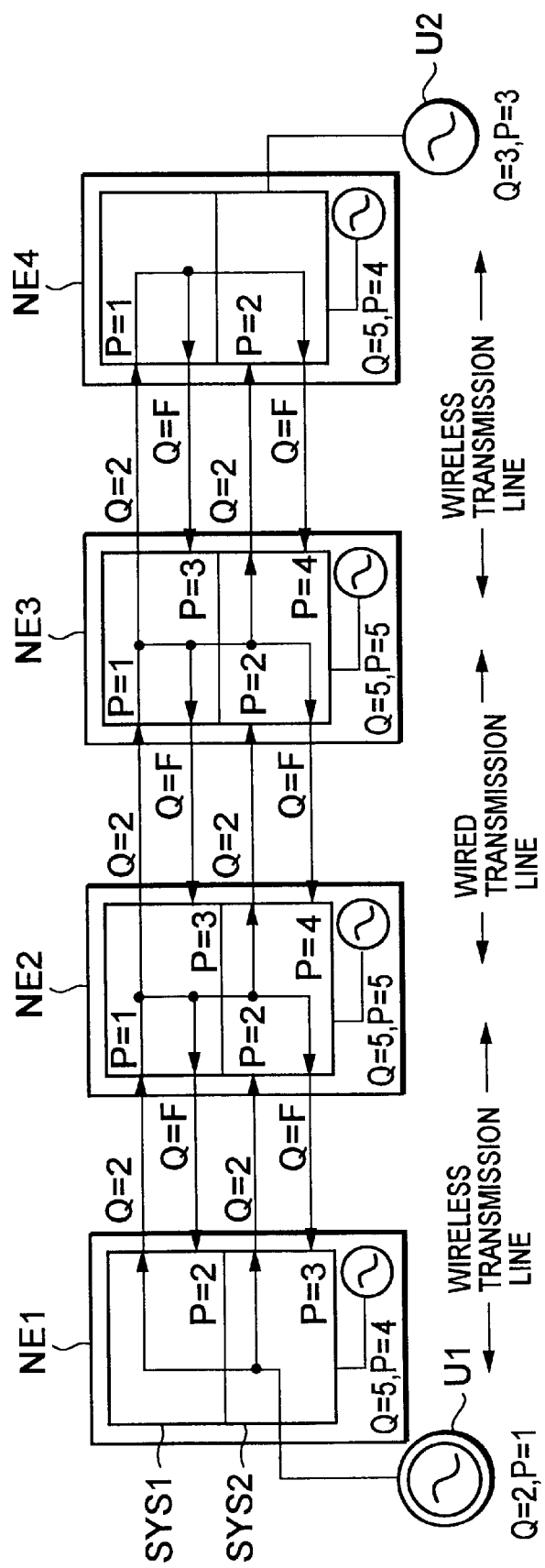
FIGS. 5A and 5B are block diagrams for illustrating operations of the embodiment of the present invention.
Figure 5B:
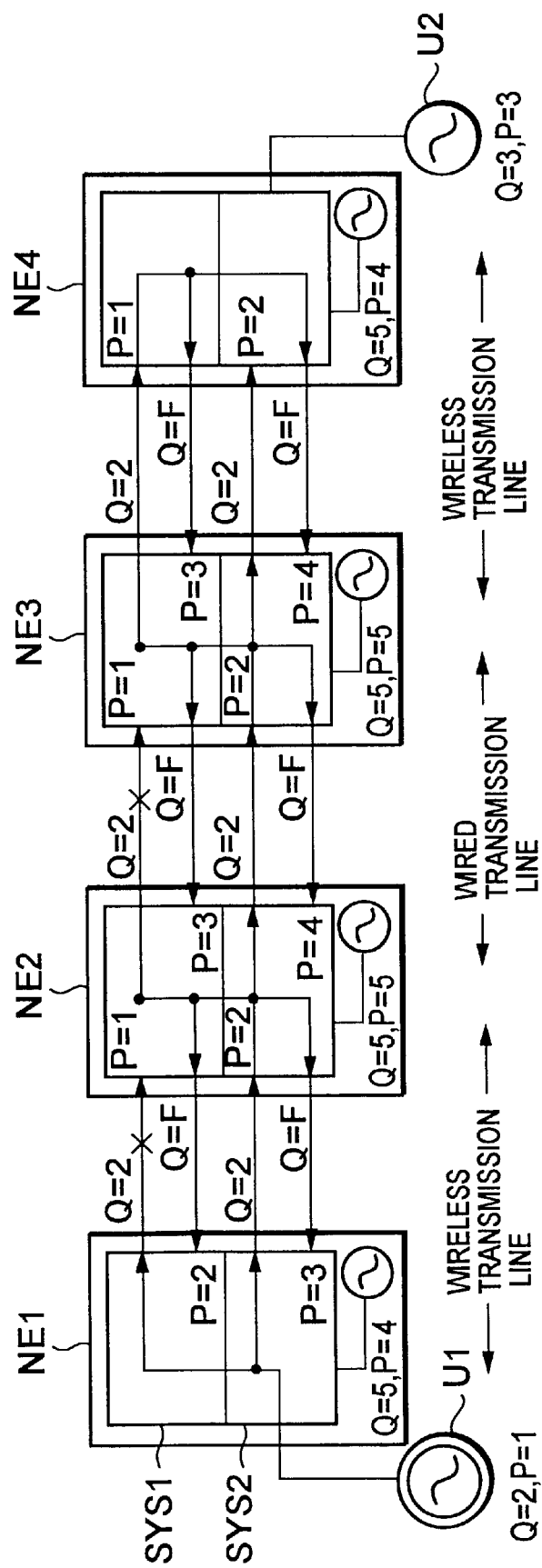
Figure 6:
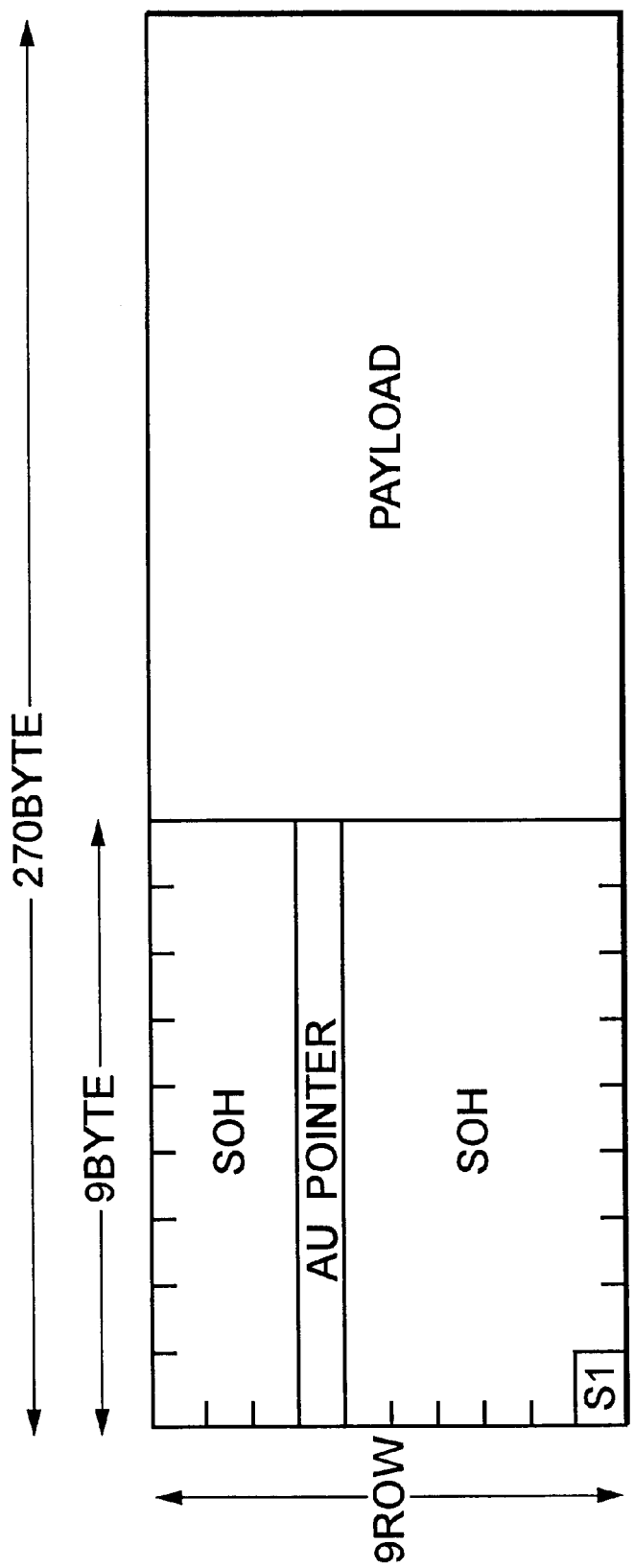
FIG. 6 is a view showing an example of an SDH frame construction.
Figure 8:
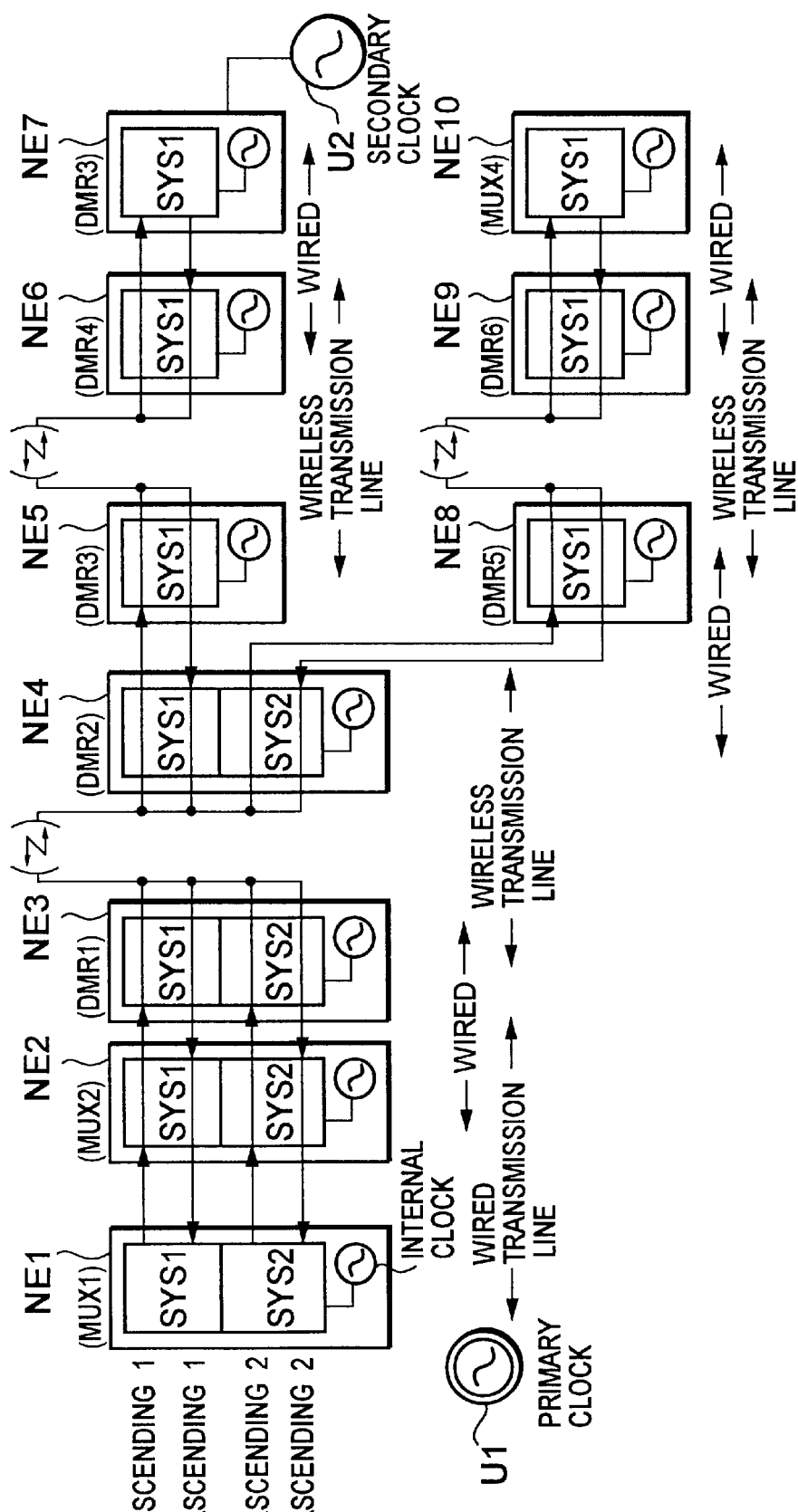
FIG. 8 is an example of a system construction for illustrating a prior art.
Figures 9A, 9B:
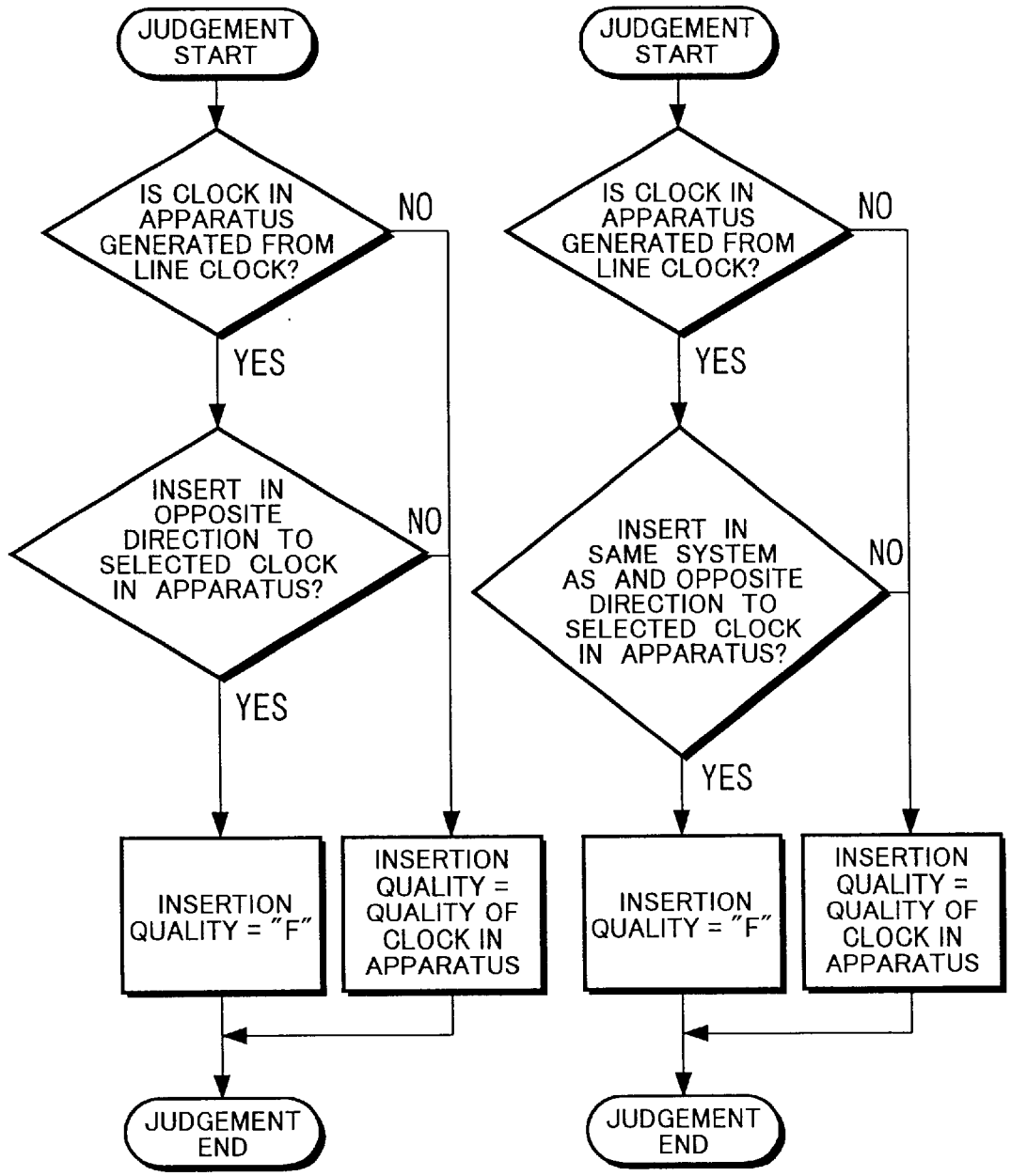
FIGS. 9A and 9B are flowcharts showing operations of the prior art.
Figure 10A:
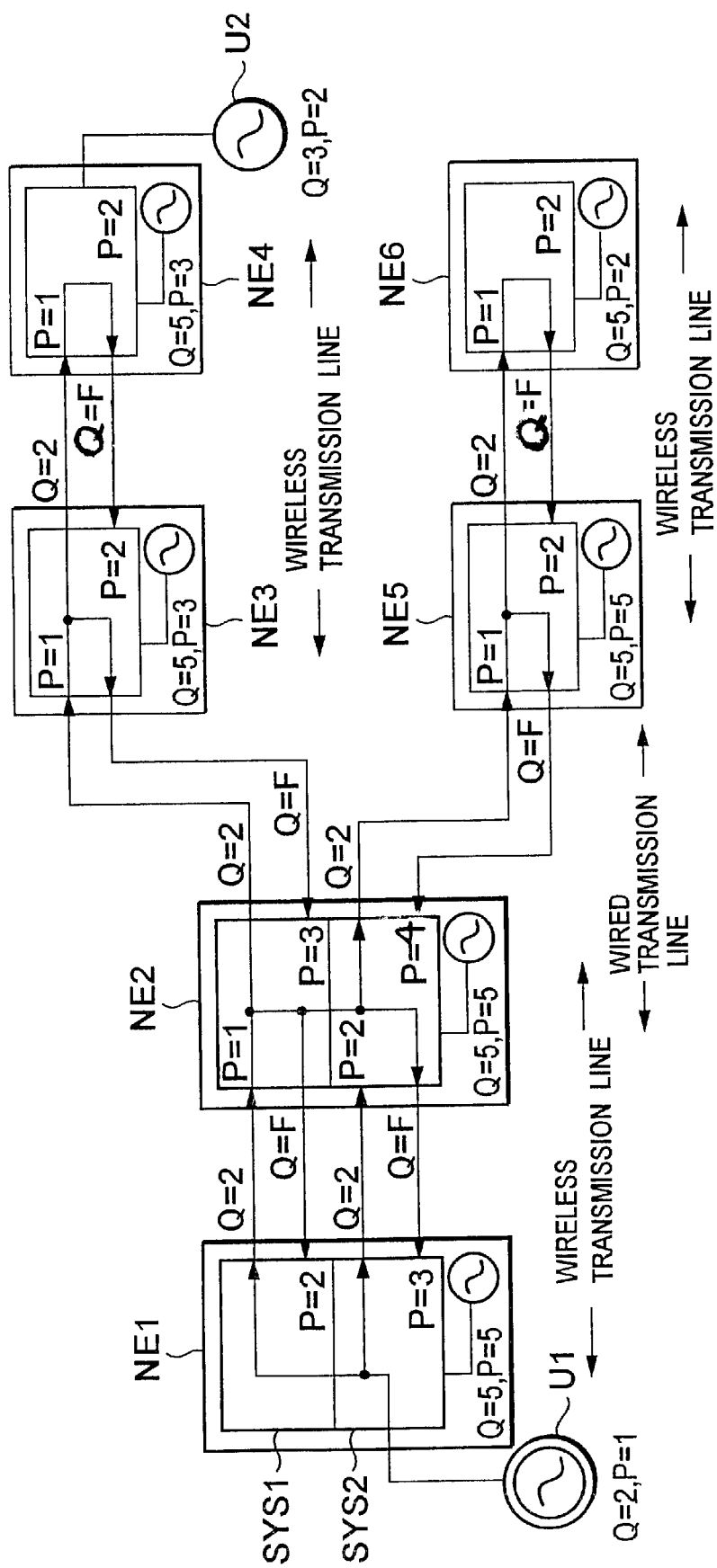
FIGS. 10A and 10B are views for illustrating operations of the prior art.
Figure 10B:
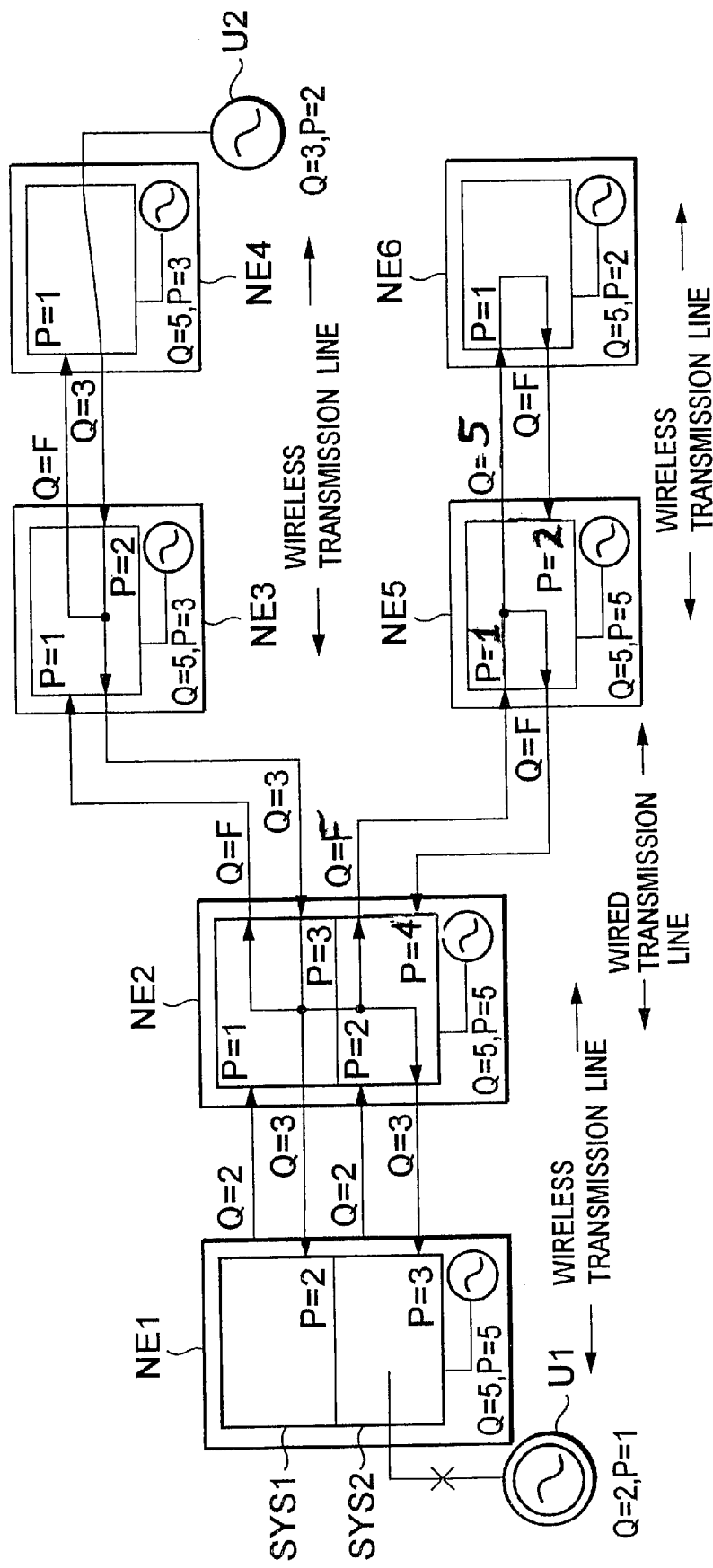
Figure 11A:
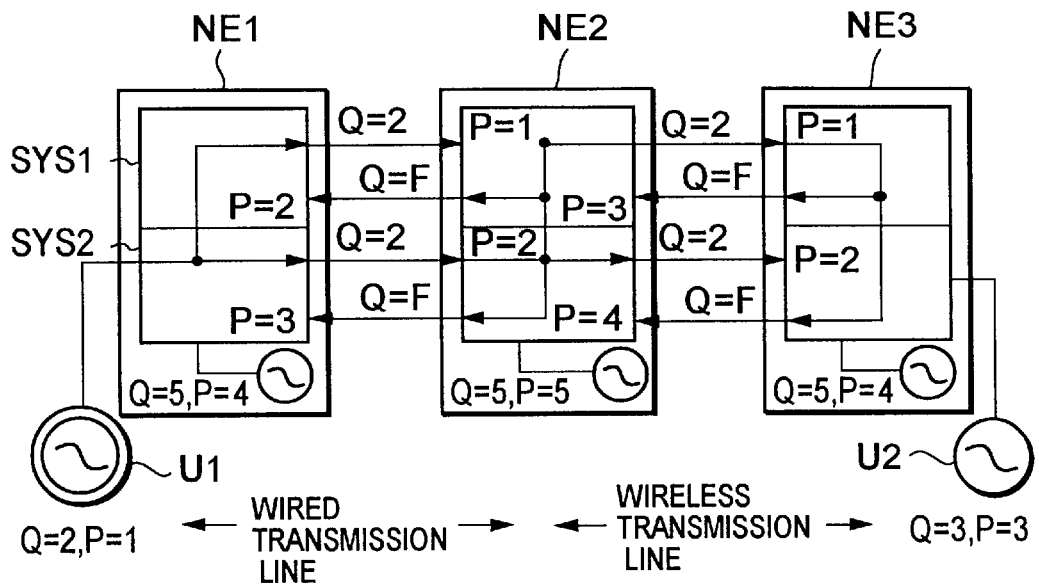
FIGS. 11A to 11D are views for illustrating operations of the prior art.
Figure 11B:
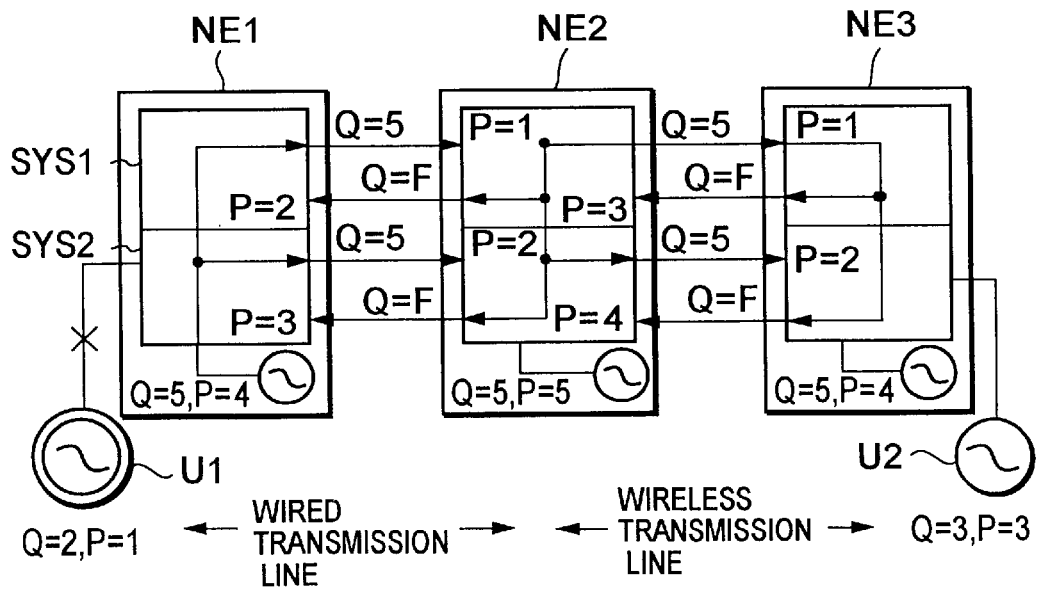
Figure 11C:
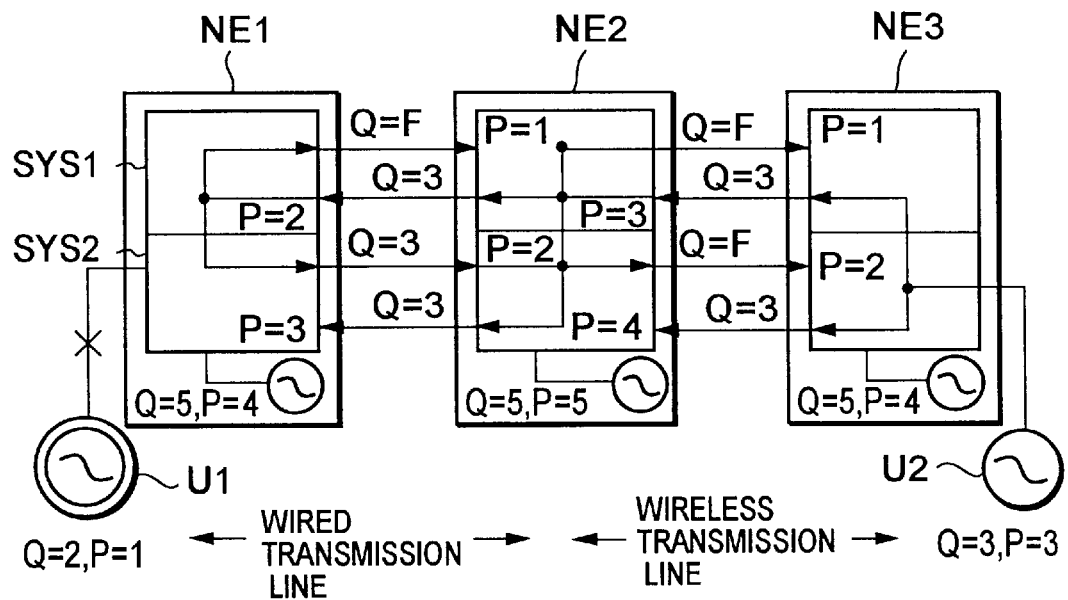
Figure 11D:
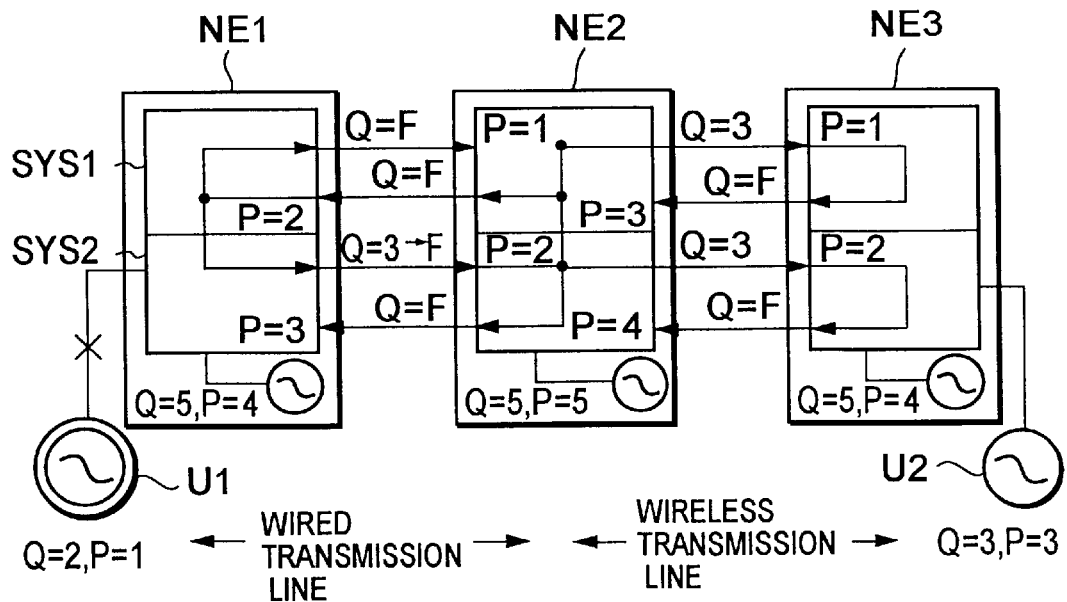

Operations in another network construction using an embodiment of the present invention will be described with reference to FIGS. 5A and 5B. In FIGS. 5A and 5B, NE1 to NE4 denote radio terminal station apparatus having the constructions of an embodiment of the present invention, wherein data signal sequences of two systems of SYS1 and SYS2 are transmitted. FIG. 5A is a view showing a synchronous state of the SDH network in a stationary state.

In FIG. 5A, in NE1, because the quality of the output clock of U1 is the highest, it operates with the clock in the apparatus synchronized with U1, and Q=2 is multiplexed with SYS1 and SYS2. In NE2 to NE4, because the qualities of the line clocks from NE1 to NE3 are the highest, respectively, besides, as for the priority, SYS1 is established to P=1 that is the highest, they operate with the clocks in the apparatus synchronized with the line clocks of SYS1 in the direction of (NE1→NE4), and Q=2 is output in the same direction after multiplexing.

Besides, processing in the direction of (NE4→NE1) is as follows. First, in NE2 and NE4, because the clock of the SDH network is synchronized in the direction of (NE1→NE2→NE3→NE4), in the direction of (NE4→NE3→NE2→NE1) that is the opposite direction, the quality Q=F for inhibiting a timing loop is multiplexed in both of SYS 1 and SYS 2. Besides, in SYS1 of NE3, because the line clock that was the origin of the clock in the apparatus is opposite to the quality multiplexing direction and they are the same system, Q=F is multiplexed like NE2 and NE4.

Further, in SYS2 of NE3, because the priority P=2 is established in the input direction from NE2 and this is not the special priority P=F, it is judged that both of SYS1 and SYS2 are opposite, and Q=F is multiplexed. As described above, all systems of the SDH network are synchronized with the output clock of U1.

Next, a state that a trouble or the like of the transmission line arises will be described with reference to FIG. 5B. FIG. 5B is a view in case that troubles arise on the transmission lines of SYS1 of (NE1→NE2) and (NE2→NE3). First, in NE1, the output clock of U1 is selected as the clock in the apparatus like the stationary state shown in FIG. 5A, and Q=2 is sent out to NE2. In NE2, though no signal is transmitted to SYS1 due to the trouble of the transmission line, because the signal input from NE1 to SYS2 is the signal of Q=2 synchronized with U1, the clock in the apparatus becomes a signal synchronized with U1.

And, to (NE2→NE3), the quality Q=2 of the clock in the apparatus is multiplexed and sent out in both of SYS1 and SYS2. In NE3, because the trouble arises on SYS 1 between (NE2→NE3), in SYS1, the line clock can not be extracted from the data signal sequence having been sent out from NE2.

Accordingly, like NE2, the line clock of the data signal sequence input from NE2 to SYS2 is selected as the clock in the apparatus. In NE4, because the qualities of the data signal sequences from NE3 are Q=2 in both of SYS1 and SYS2, following the establishment of the priority, it operates with the clock in the apparatus synchronized with the line clock of SYS1. Besides, with all of the outputs of NE2 to NE4 in the direction of (NE4→NE3→NE2→NE1), the quality Q=F for inhibiting a timing loop is multiplexed by similar operations to those of the stationary state shown in FIG. 5A.

As described above, all apparatus are synchronized with the output clock of U1 through the route of (U1→NE1→SYS2 of NE2→SYS2 of NE3→SYS1 of NE4).

Further, although the above-described radio terminal station apparatus has the construction to connect to the wired transmission line and wireless transmission line, and changes the processes for multiplexing the qualities in accordance with the transmission lines to connect, it can be applied in the transmission terminal station apparatus having the construction that both directions are wired transmission lines, by changing processing conditions.

As described above, according to the present invention, when a plurality of data signal sequences having SDH frame constructions are transmitted, because it can have a redundant construction for the transmission line having the highest quality, the quality of the SDH network can be kept high even when a trouble or the like arises on the transmission line, and the synchronous network construction never breaks due to a generation of a timing loop.

Besides, in case that the transmission directions of the data signal sequences are branched and different by the wired transmission lines, by using the special priority defined in the system beforehand, a radio terminal station apparatus for an SDH network can be provided wherein the branched route can be synchronized with the clock of the high quality, and, without breaking the synchronous construction of the whole network, a generation of a timing loop can be also prevented.

What is claimed is:

1. A radio terminal station apparatus for an SDH network including plural sets of up-link and down-link transmission systems in each of which a degree of priority is given to its input port part in advance, said apparatus comprising:
   clock selection means for selecting a clock of the best quality as the clock in the apparatus from an external clock, an internal clock, and a line clock from each up-link and down-link transmission system connected to the apparatus on the basis of quality information indicating their qualities; and
   multiplexing means for comparing the insertion direction and insertion system to multiplex and insert said quality information with the input direction and system providing the clock in the apparatus, respectively, and, in the case of the insertion system not being the system providing the clock in the apparatus and the insertion direction being opposite to the input direction of the clock in the apparatus and when the priority degree information of the system having an input direction opposite to the insertion direction is a special value defined in advance, multiplexing and sending out the same quality information as said clock in the apparatus, wherein the special value defined in advance is not a value that is a priority degree to which other priority degrees can be compared to provide a relative priority.

2. The radio terminal station apparatus for an SDH network according to claim 1, wherein said clock selection means selects the clock of the highest degree of priority when there is a plurality of clocks of the best quality.

3. The radio terminal station apparatus for an SDH network according to claim 1, wherein said multiplexing means multiplexes and sends out information indicating that the clock is not selected, as said quality information, when said quality information is multiplexed and inserted into a wireless transmission line.

4. A method of selecting an operation clock in a radio terminal station apparatus for an SDH network including plural sets of up-link and down-link transmission systems in each of which a degree of priority is given to its input port part in advance, comprising:
   a clock selection step of selecting a clock of the best quality as the clock in the apparatus from an external clock, an internal clock, and a line clock from each up-link and down-link transmission system connected to the apparatus on the basis of quality information indicating their qualities; and
   a multiplexing step of comparing the insertion direction and insertion system to multiplex and insert said quality information with the input direction and system providing the clock in the apparatus, respectively, and, in the case of the insertion system not being the system providing the clock in the apparatus and the insertion direction being opposite to the input direction of the clock in the apparatus and when the priority degree information of the system having an input direction opposite to the insertion direction is a special value defined in advance, multiplexing and sending out the same quality information as said clock in the apparatus, wherein the special value defined in advance is not a value that is a priority degree to which other priority degrees can be compared to provide a relative priority.

5. The method of selecting an operation clock in a radio terminal station apparatus for an SDH network according to claim 4, wherein said clock selection step comprises a step of selecting the clock of the highest degree of priority when there is a plurality of clocks of the best quality.

6. A method of selecting an operation clock in a radio terminal station apparatus for an SDH network according to claim 4, wherein said multiplexing step comprises a step of multiplexing and sending out said special value as said quality information when said quality information is multiplexed and inserted into a wireless transmission line.

7. A recording medium on which a program is recorded for controlling a method of selecting an operation clock in a radio terminal station apparatus for an SDH network including plural sets of up-link and down-link transmission systems in each of which a degree of priority is given to its input port part in advance, said program comprising:
   a clock selection step of selecting a clock of the best quality as the clock in the apparatus from an external clock, an internal clock, and a line clock from each up-link and down-link transmission system connected to the apparatus on the basis of quality information indicating their qualities; and a multiplexing step of comparing the insertion direction and insertion system to multiplex and insert said quality information with the input direction and system providing the clock in the apparatus, respectively, and, in the case of the insertion system not being the system providing the clock in the apparatus and the insertion direction being opposite to the input direction of the clock in the apparatus and when the priority degree information of the system having an input direction opposite to the insertion direction is a special value defined in advance, multiplexing and sending out the same quality information as said clock in the apparatus, wherein the special value defined in advance is not a value that is a priority degree to which other priority degrees can be compared to provide a relative priority.

* * * * *